United States Patent [19]
Carnley et al.

[11] 4,261,680
[45] Apr. 14, 1981

[54] APPARATUS FOR ORIENTING ARTICLES HAVING AN ENLARGED END

[76] Inventors: F. Paul Carnley, Oscar Harvey Rd., Star Rte. Box 89-B, Tallahassee, Fla. 32304; John Cugini, 27 Driftway, Hopedale, Mass. 01747; Charles E. Benedict, 3114 Lakeshore Dr., West, Tallahassee, Fla. 32312

[21] Appl. No.: 46,134

[22] Filed: Jun. 6, 1979

[51] Int. Cl.³ .............................................. B65G 47/24
[52] U.S. Cl. ....................................... 414/421; 86/45; 86/48; 198/376; 198/399; 414/762
[58] Field of Search ...................... 86/45, 48; 198/376, 198/377, 399; 221/156; 414/421, 762

[56] References Cited

U.S. PATENT DOCUMENTS

| | | | |
|---|---|---|---|
| 2,433,010 | 12/1947 | Woodberry et al. | 86/48 X |
| 2,446,184 | 8/1948 | Mason | 86/48 |
| 2,453,736 | 11/1948 | Woodberry et al. | 86/45 X |
| 2,693,872 | 11/1954 | Baader | 198/376 |
| 2,857,039 | 10/1958 | Whitecar | 198/408 |
| 3,317,015 | 5/1967 | Buggele et al. | 195/43 |

*Primary Examiner*—Leland A. Sebastian

[57] ABSTRACT

An apparatus for orienting randomly arranged articles having an enlarged end, such as large caliber ammunition or the like, so that all of the articles are facing in the same direction. The apparatus senses the direction in which the articles are facing and passes all of the articles facing one direction, while inverting the articles facing in the opposite direction so that all of the articles discharged from the apparatus are facing in the same direction.

9 Claims, 16 Drawing Figures

APPARATUS FOR ORIENTING ARTICLES HAVING AN ENLARGED END

SUMMARY OF THE INVENTION

The present invention relates generally to article handling apparatus and is embodied particularly in an apparatus for orienting randomly arranged articles having an enlarged end, such as large caliber rounds of ammunition, which are normally supplied to the apparatus with their longitudinal axes in generally parallel relationship. The apparatus determines the direction in which the articles are facing and inverts all of the articles facing in one direction so that all of the articles which are discharged from the apparatus are facing in the same direction.

In one embodiment of the invention the articles are placed in openings on a rotary table having a plurality of rotating disks which are selectively rotated when an article carried thereby is facing in one direction so that all of the articles are discharged from the same discharge station, and in another embodiment the articles facing in one direction are discharged from a first discharge station, while the articles facing in the other direction are charged from a second discharge station. Additionally apparatus is provided for removing packing material or dunnage from the articles after the articles have been discharged from the orienting apparatus.

It is an object of the invention to provide an apparatus for orienting randomly arranged tapered articles or articles having an enlarged end, such as ammunition or the like, so that all of the articles are facing in the same direction with their longitudinal axes being in generally parallel relationship with each other.

Another object of the invention is to provide an apparatus for orienting randomly arranged articles having an enlarged end which includes a rotating table having a plurality of rotatable disks which are selectively rotated depending upon the direction in which the articles carried thereby are facing so that the articles are discharged from the apparatus at a discharge station with all of the articles facing in the same direction.

A further object of the invention is to provide an apparatus for orienting randomly arranged articles having an enlarged end in which the articles facing in one direction are discharged at a first discharge station and articles facing in the opposite direction are discharged from a second discharge station located substantially diametrically opposite the first discharge station, and the first and second discharge stations are joined to each other so that all of the articles being discharged from the apparatus are facing in the same direction.

DESCRIPTION OF THE PREFERRED EMBODIMENTS

Figure 1:
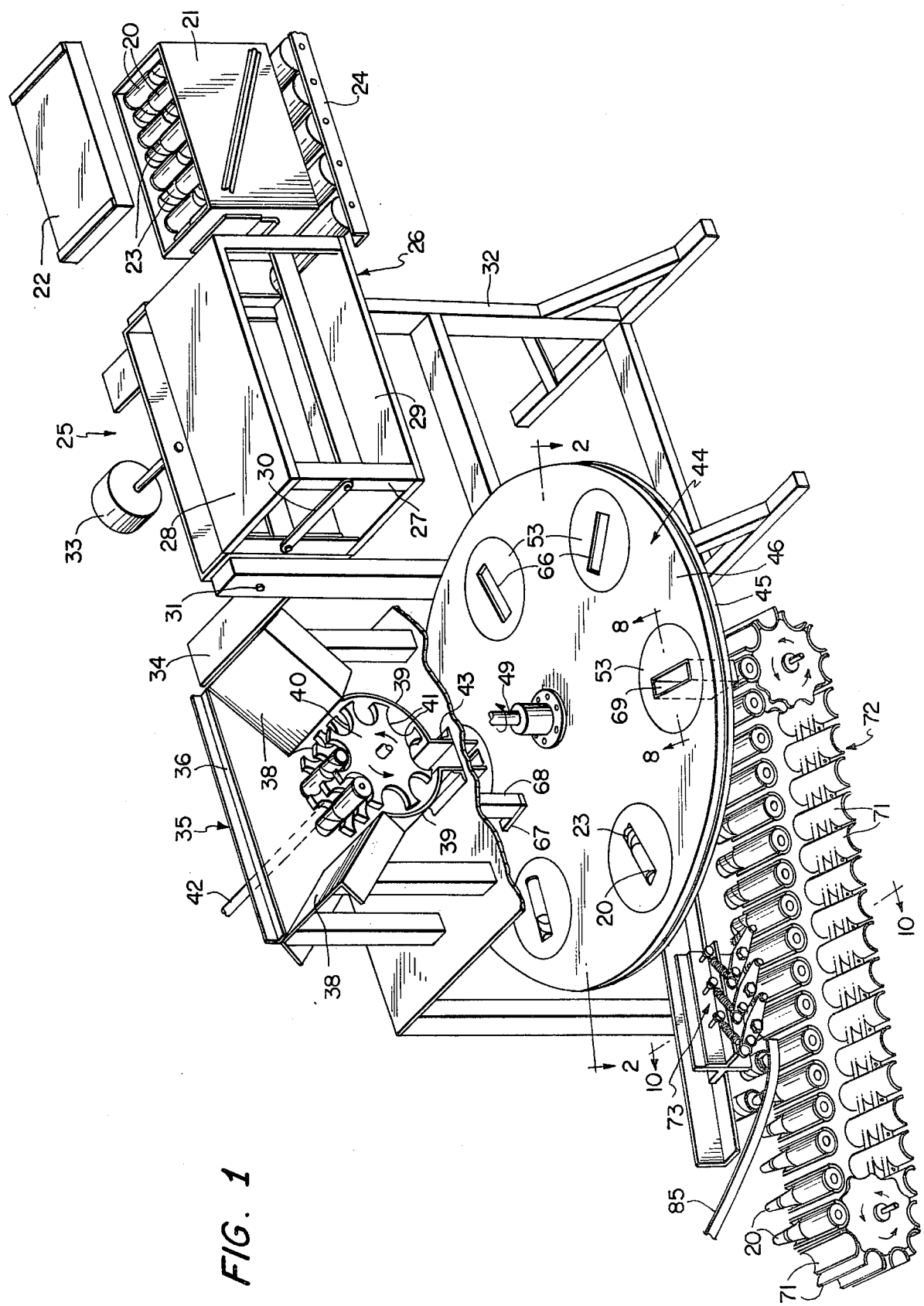
FIG. 1 is a perspective illustrating a first embodiment of the apparatus in use.

With continued reference to the drawings, a plurality of articles 20 having an enlarged end, such as relatively large tapered round of ammunition having a caliber of approximately 20 mm to 40 mm, normally are transported in an ammunition box 21 having a removable cover or lid 22. Each of the rounds of ammunition includes a casing which is circular in cross-section and has a projectile extending outwardly from one end. The projectile is smaller in cross-section than the casing so that the overall configuration is tapered from a large end to a small end. Ordinarily when large rounds of ammunition are being transported, a protective or dunnage sleeve 23 is placed over the projectile, however, the outer diameter of such sleeve is smaller than the butt end of the casing of the round so that the overall configuration remains tapered from end to end. Ordinarily the articles or rounds of ammunition 20 are packed in alternate directions with the longitudinal axes being generally parallel with each other in such a manner that the small end of one article is located contiguous to the large ends of adjacent articles. By alternating the facing directions, a plurality of relatively straight layers or tiers may be stacked within the box 21.

Usually when the rounds are removed from the box 21 and placed in a ready armament system, such rounds are removed one at a time after which the dunnage sleeve 23 is manually removed and the round is manually placed within an ammunition belt of conventional construction with the projectiles all facing in the same direction. Due to the increased fire power of military aircraft, the weapons which use the rounds of ammunition are capable of firing up to 4,000 rounds per minute and therefore the armament system of the aircraft has been enlarged to receive a large number of rounds. After a substantial number of rounds have been fired and the aircraft returns to its base for refueling and rearming, it is desirable to rearm the aircraft as rapidly as possible and in order to do this the manual removing of the protective sleeve and orienting the rounds are objectionable due to the time required.

The apparatus of the present invention is adapted to receive boxes filled with rounds of ammunition or other articles having an enlarged end in which a portion of the articles are facing in one direction, while other articles are facing in the opposite direction and the longitudinal axes of such articles are generally parallel with each other. The articles are discharged from the box or container into a hopper from which they are randomly removed one at a time and are fed to an orienting table where the articles which are facing in one direction are moved to a discharge station, while the articles facing in the opposite direction are inverted before they are discharged so that all of the articles are facing in the same direction.

With particular reference to FIG. 1 of the drawings, the apparatus of the present invention is illustrated for use with the orienting of rounds of ammunition, however, it is noted that the orienting portion of the apparatus could be used for other articles. The boxes or containers 21 which are filled with rounds of ammunition are transported to an ammunition depot or the like where such boxes are placed on conveyor 24 with the cover or lid 22 uppermost. The conveyor 24 is of conventional construction and the boxes may be moved along the same by gravity or the conveyor may be selectively driven. The conveyor 24 moves the boxes one at a time to a position adjacent to an inverting mechanism 25 after which the cover or lid 22 is removed from the box. If desired a selectively operated stop (not shown) could be located adjacent to the end of the conveyor to stop the box in a fixed position until the cover is removed.

After the cover has been removed, the box is moved from the conveyor 24 into a receptacle 26 having a frame 27 on which first and second plates 28 and 29, respectively, are mounted. One end of the frame is open to receive the box 21, while the other end may be provided with a rotatable latch 30 to retain the box within the receptacle. The receptacle 26 is connected by pivots 31 to the upper end of a support or stand 32 with the receptacle being located on one side of the support, while a counterweight 33 is attached to the receptacle 26 and extends to the opposite side of the support. When a box has been inserted into the receptacle, the receptacle is rotated about the pivots 31 to the opposite side of the support 32 in which position the receptacle engages a stop plate 34 forming a part of a hopper 35.

When the receptacle is rotated about the pivots 31, the box 21 is inverted so that the open side of the box and the rounds of ammunition or other articles carried within such box are supported by the first plate 28. In this position the latch 30 is rotated to open position and the box is moved lengthwise from the receptacle 26 to a position overlying the hopper 35 so that the articles contained in the box are discharged into the hopper. The hopper includes a pair of supporting guide tracks 36 (only one of which is shown) to facilitate movement of the box 21 to a position above the hopper so that the shells are discharged into the hopper.

The hopper includes a pair of inclined walls 38 the lower ends of which are connected to arcuate walls 39 defining a chamber in which a drum 40 is rotatably mounted. The drum 40 includes a plurality of longitudinally extending grooves 41 around its periphery and each of such grooves is of a size to receive one of the articles 20 which are located within the hopper 35. The drum 40 is fixed to a shaft 42 which is driven in any desired manner (not shown) so that the articles are individually removed from the hopper. A chute or magazine 43, of a length to receive several rounds of ammunition in stacked relationship, is located below the drum 40 so that articles located within the grooves of the drum fall by gravity into the magazine 43 as the drum rotates past such magazine.

Figure 5:
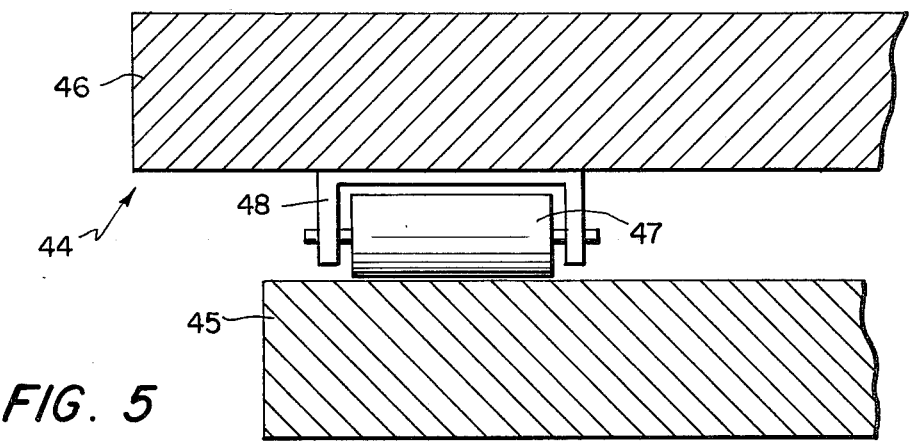
FIG. 5 is an enlarged fragmentary section taken on the line 5—5 of FIG. 2.

The bottom of the magazine 43 is open and is disposed closely adjacent to an orienting table 44 including a fixed lower plate 45 and a rotatable upper plate 46. The upper plate 46 is spaced above the lower plate 45 a relatively short distance and is supported thereon by a plurality of rollers 47 (FIG. 5) which may be mounted in any desired manner, such as by brackets 48. As illustrated, the upper plate 46 is rotated by a drive shaft 49 which in turn is driven by any convenient source of power (not shown). However, it is contemplated that the upper plate 46 could be driven in any other conventional manner, such as gearing, belts or the like.

Figure 4:
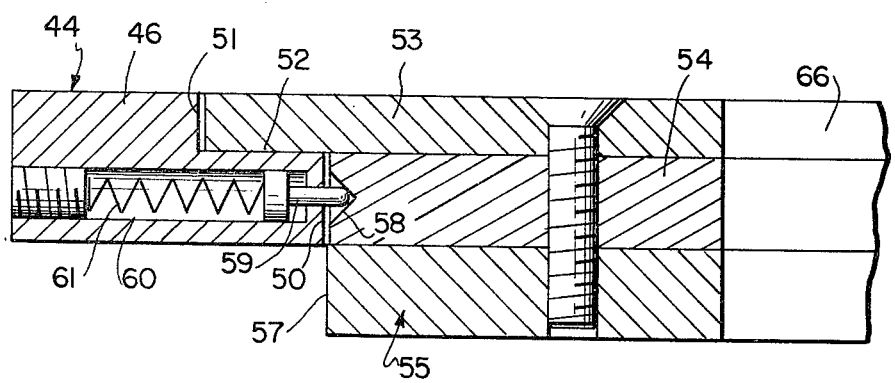
FIG. 4 is an enlarged fragmentary section taken on the line 4—4 of FIG. 2.

The upper plate 46 is provided with a plurality of bores 50 located on a bolt circle near the outer periphery of the upper plate and each of such bores is connected to a counterbore 51 by a shoulder 52. A rotatable disk 53 having a reduced neck 54 is rotatably supported by the shoulder 52 with the neck located in the bore 50 and the disk located in the counterbore 51. A spur gear 55 having interrupted peripheral teeth 56 is secured to the neck 54 and such gear is of a diameter larger than the bore 50 so that the disk and neck cannot move vertically. As illustrated best in FIG. 2, the spur gear 55 has a pair of opposed peripheral flat portions 57 which have a radius slightly less than the radius of the root circle of the gear teeth 56 and such flat portions usually are disposed generally normal to a radial line on the upper plate 46 which extends through the center of the rotatable disk 53. In order to retain the gear 55 in this position, the neck 54 is provided with a pair of diametrically disposed recesses 58 (FIG. 4) one of which receives a detent pin 59 slidably mounted in a recess 60 which extends inwardly from the periphery of the upper plate 46. A spring or other resilient member 61 normally urges the detent pin 59 into engagement with the neck 54 and into the recesses 58.

Figure 2:
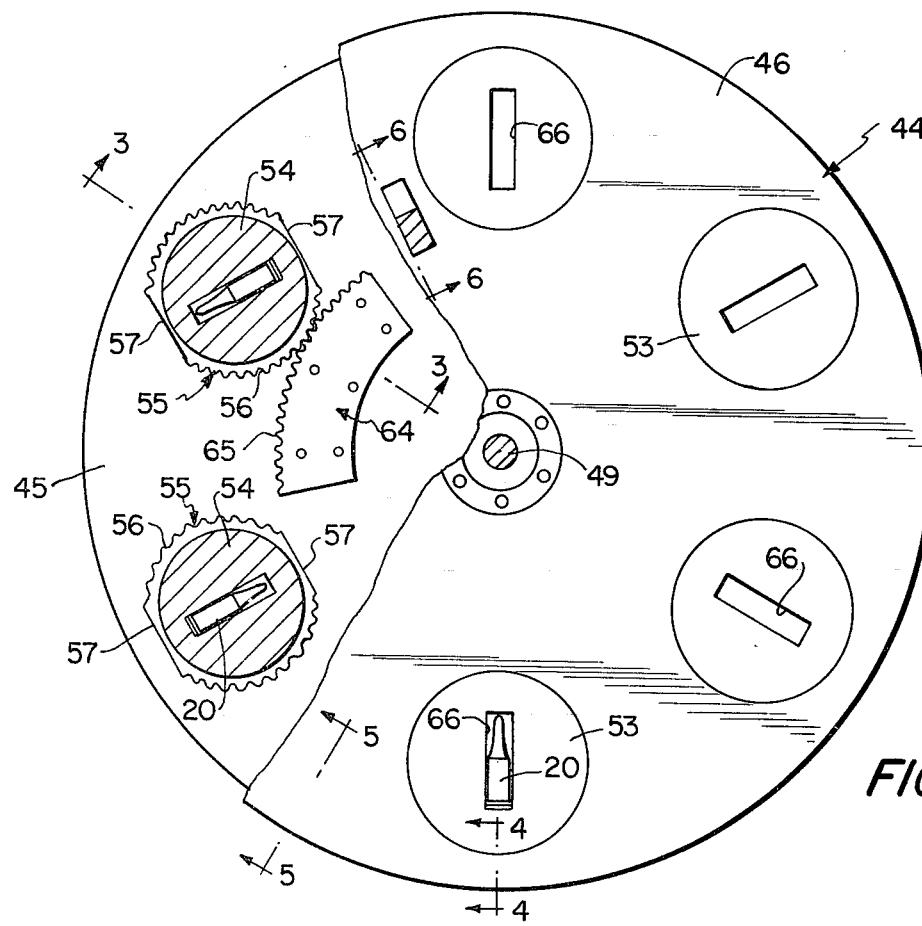
FIG. 2 is an enlarged section taken on the line 2—2 of FIG. 1.
Figure 3:
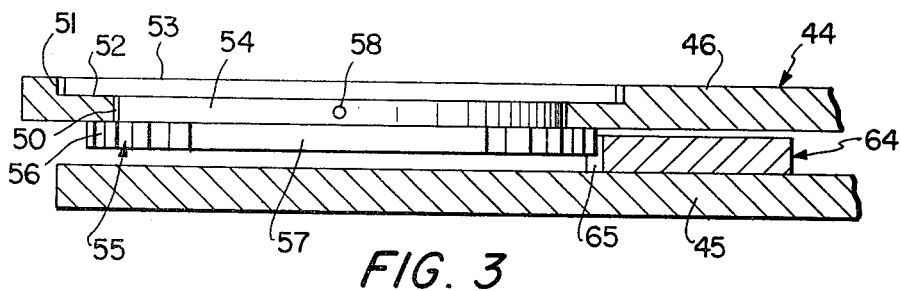
FIG. 3 is an enlarged fragmentary section taken on the line 3—3 of FIG. 2.

With particular reference to FIGS. 2 and 3, a segmental gear 64 having outwardly disposed teeth 65 is mounted on the lower plate 45 in any desired manner, as by screws or the like, and such segmental gear is positioned so that the teeth 65 selectively mesh with the teeth 56 of the spur gear 55 and cause the disk 53 to be rotated substantially 180°. The disk 53, neck 54 and gear 55 are provided with an axial slot 66 of a size to receive a round of ammunition or other article. As shown best in FIG. 6, the round of ammunition rests on the lower plate 45 and the butt end of the round extends above the upper plate 46, while the smaller end of the round is disposed within the slot 66. A sensor or contact finger 67 is mounted on a fixed support 68 and is in closely spaced relationship with the upper plate 46. At least a portion of the sensor is located in a position to overlie one end of the slot 66 so as to engage the butt end of the round of ammunition 20 when such butt end is disposed radially inwardly of the slot 66.

As the upper plate 46 rotates, the inwardly disposed butt end of the round of ammunition 20 engages the sensor 67 and causes initial rotation of the disk 53 and spur gear 55 so that upon continued rotation of the upper plate 46 the teeth 56 of the spur gear mesh with the teeth 65 of the segmental gear 64 and cause the disk 53, neck 54 and spur gear 55 to rotate substantially 180° until the flat portion 57 of the opposite side of the spur gear is in facing relationship with the teeth of the segmental gear 64. In this position the detent pin 59 enters the recess 58 and holds the gear 55 against further rotation since the teeth 56 no longer mesh with the teeth 65 of the segmental gear.

Figure 6:
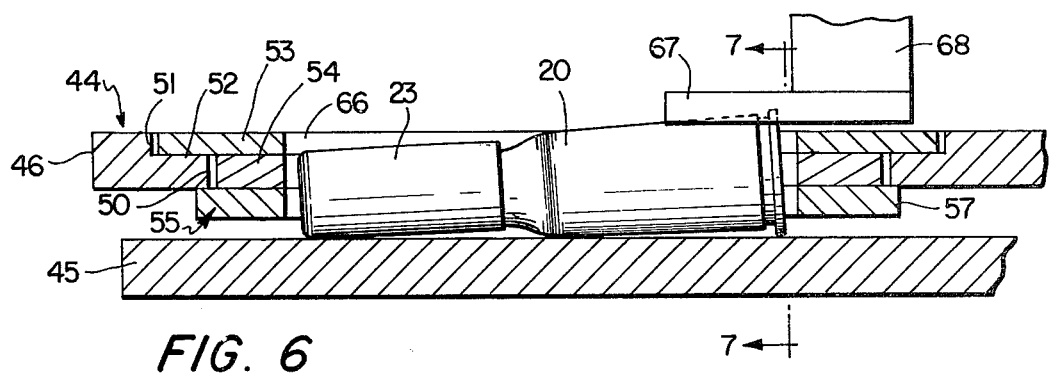
FIG. 6 is an enlarged fragmentary section taken on the line 6—6 of FIG. 2.

It is apparent that a projectile within the slot 66 which is facing in the direction opposite that of FIG. 6 will not be rotated since the dunnage or protective sleeve 23 is located below the upper surface of the upper plate 46 and will not engage the sensor 67. Since the flat portion 57 of the spur gear 55 is facing the segmental gear 64, the gear teeth do not mesh and no rotation occurs.

Figure 8:
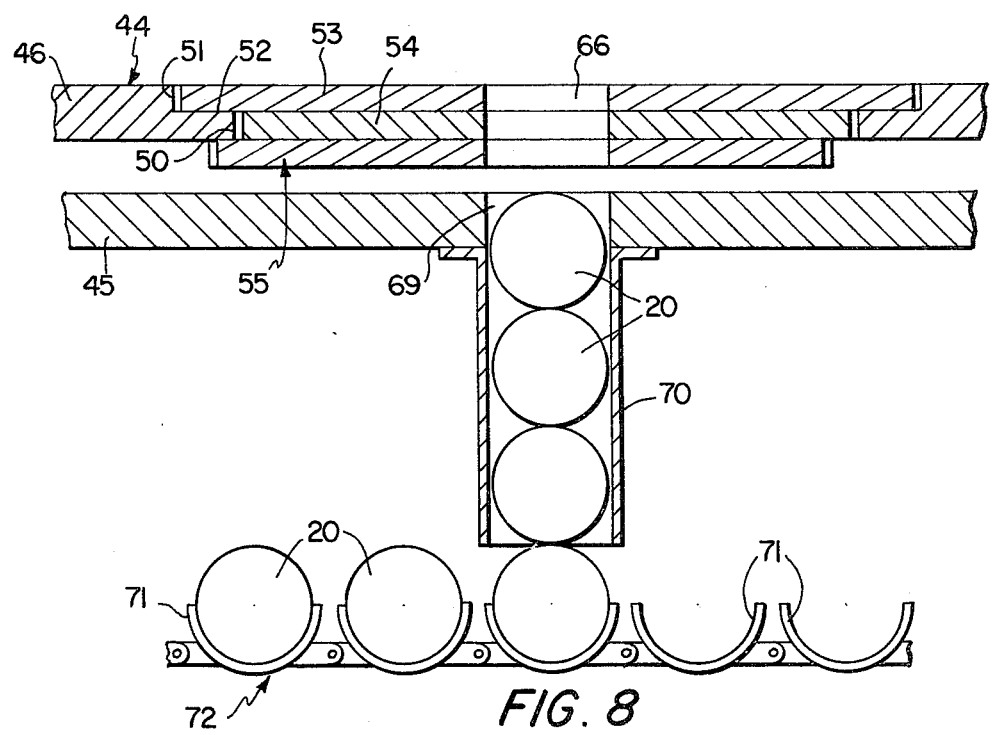
FIG. 8 is an enlarged fragmentary section taken on the line 8—8 of FIG. 1.
Figure 7:
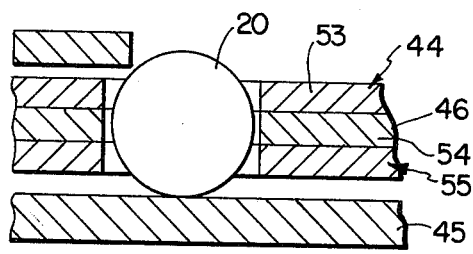
FIG. 7 is a fragmentary section taken on the line 7—7 of FIG. 6.
Figure 16:
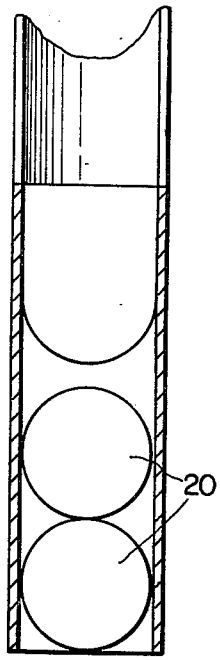
FIG. 16 is an enlarged vertical section on the line 16—16 of FIG. 12.
Figure 12:
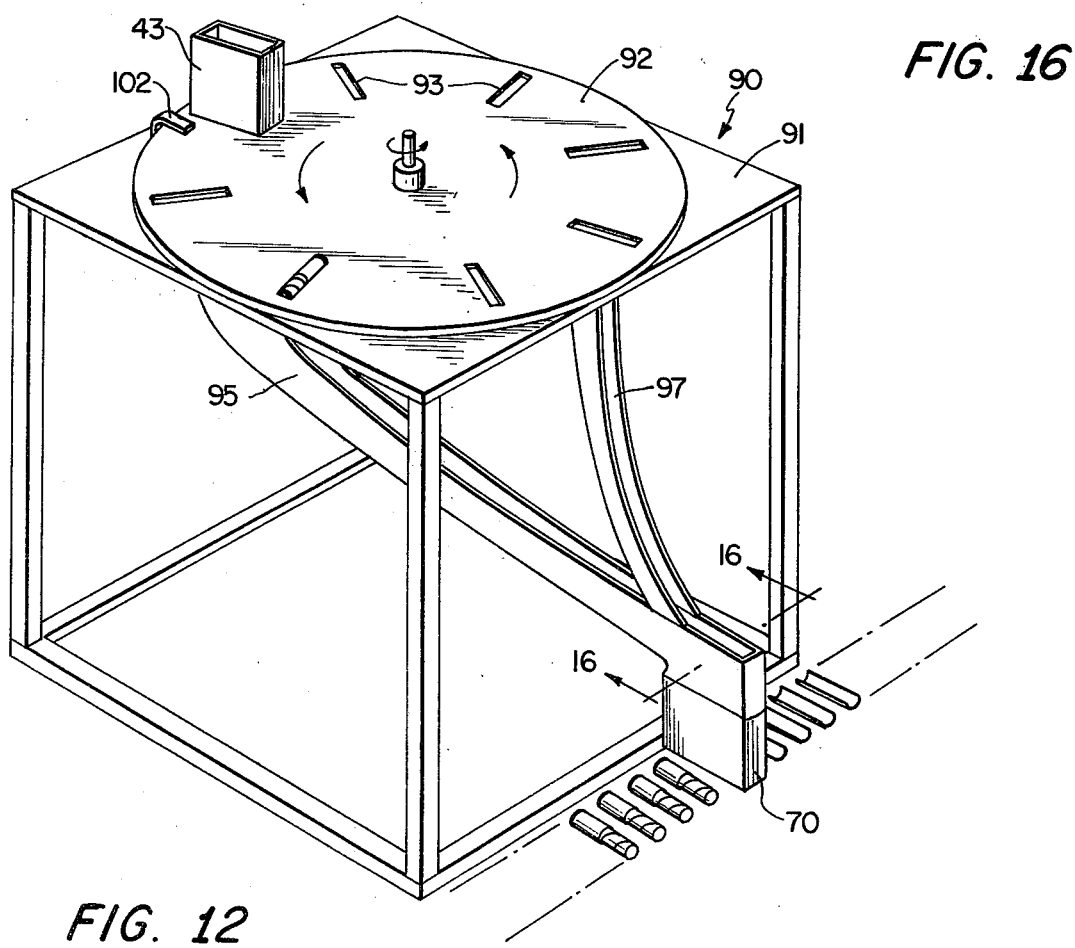
FIG. 12 is a perspective view of a rotating table of another embodiment.

At some point after the spur gear 55 has passed the segmental gear 64, a radially disposed discharge slot 69 of approximately the same size as the slot 66 extends through the fixed lower plate 45 of the orienting table and communicates with a chute or magazine 70 (FIG. 8), which preferably is of a length to accommodate several articles or rounds of ammunition. At this time all of the rounds of ammunition are facing in the same direction and are discharged one at a time onto article carrying elements 71 of a conveyor 72. Each of the elements 71 is provided with an arcuate wedge (not shown) of a size to receive the extractor groove of the round of ammunition 20 to substantially prevent axial movement of the round on the conveyor 72. The conveyor moves the rounds of ammunition away from the orienting table 44 to a dunnage removal apparatus 73.

Figure 9:
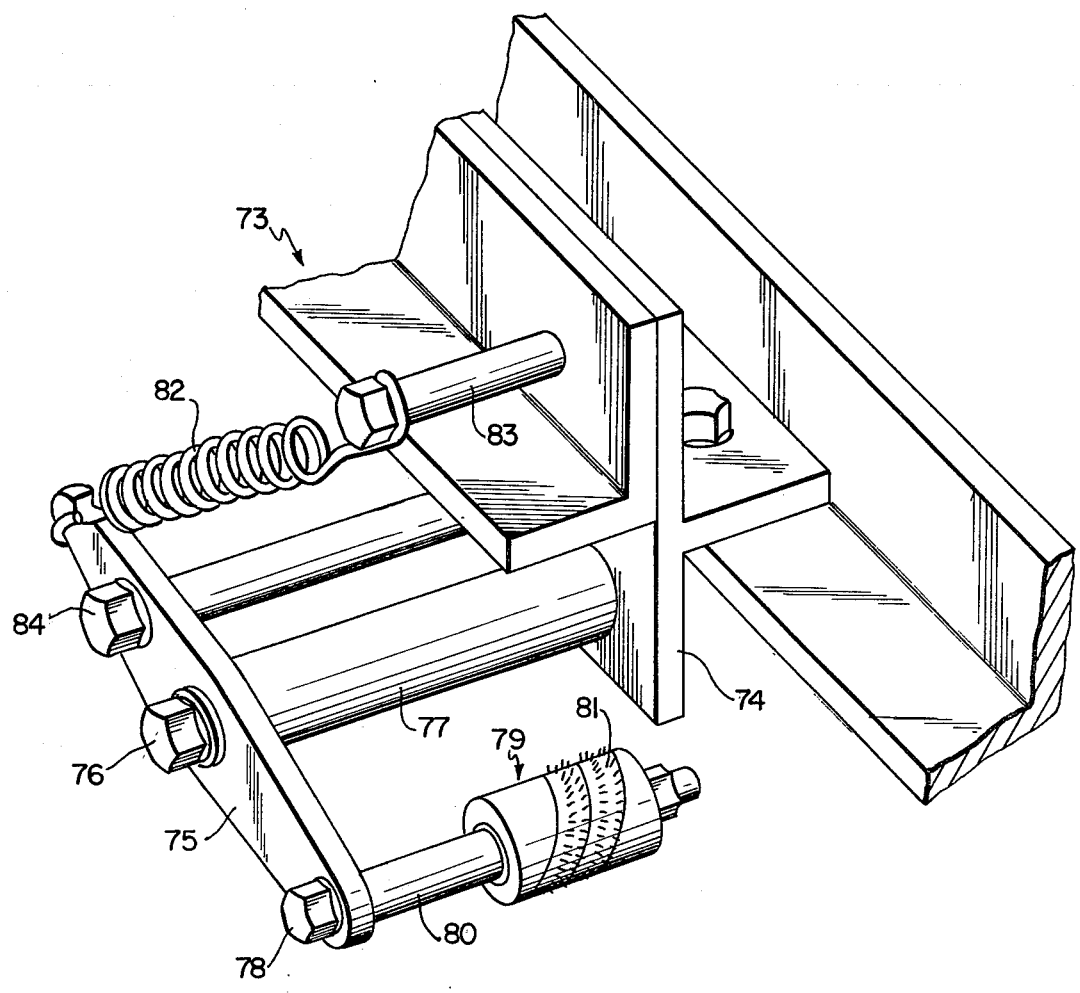
FIG. 9 is a perspective view illustrating the apparatus for stripping dunnage from the articles.
Figure 15:
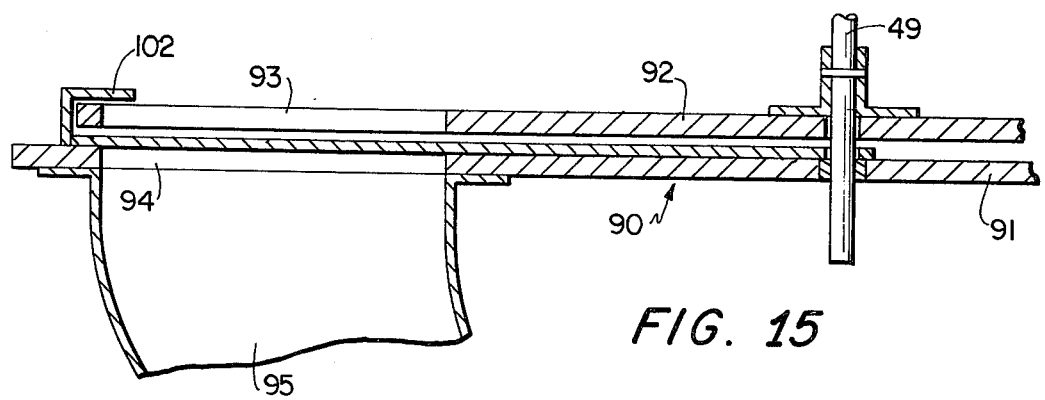
FIG. 15 is a section taken on the line 15—15 of FIG. 14.
Figure 10:
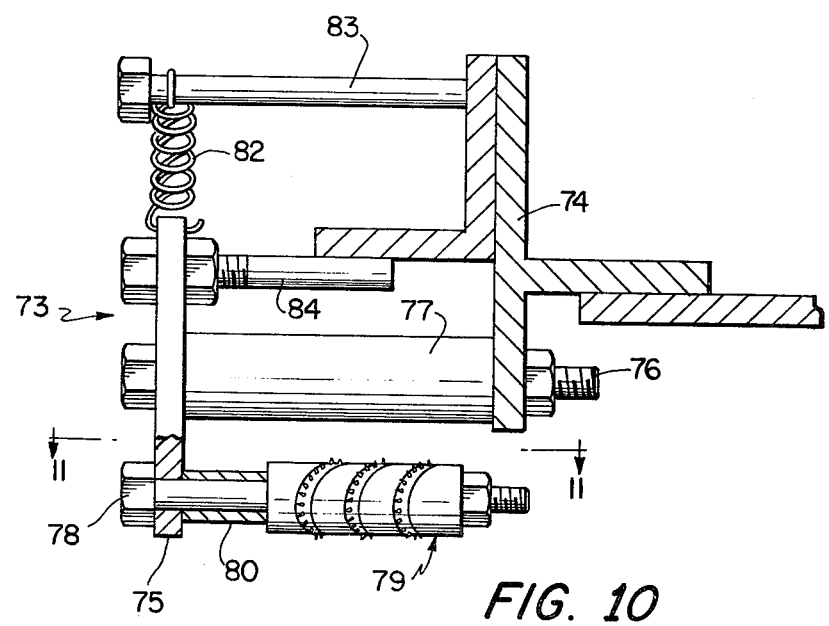
FIG. 10 is an enlarged section taken on the line 10—10 of FIG. 1.
Figure 11:
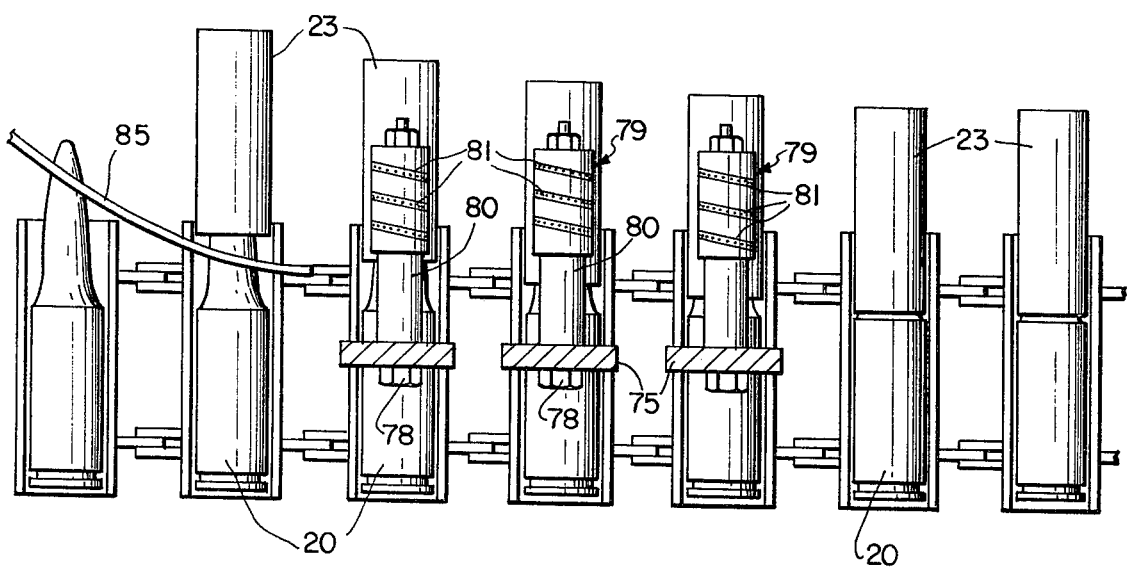
FIG. 11 is a section taken on line 11—11 of FIG. 10.
Figure 13:
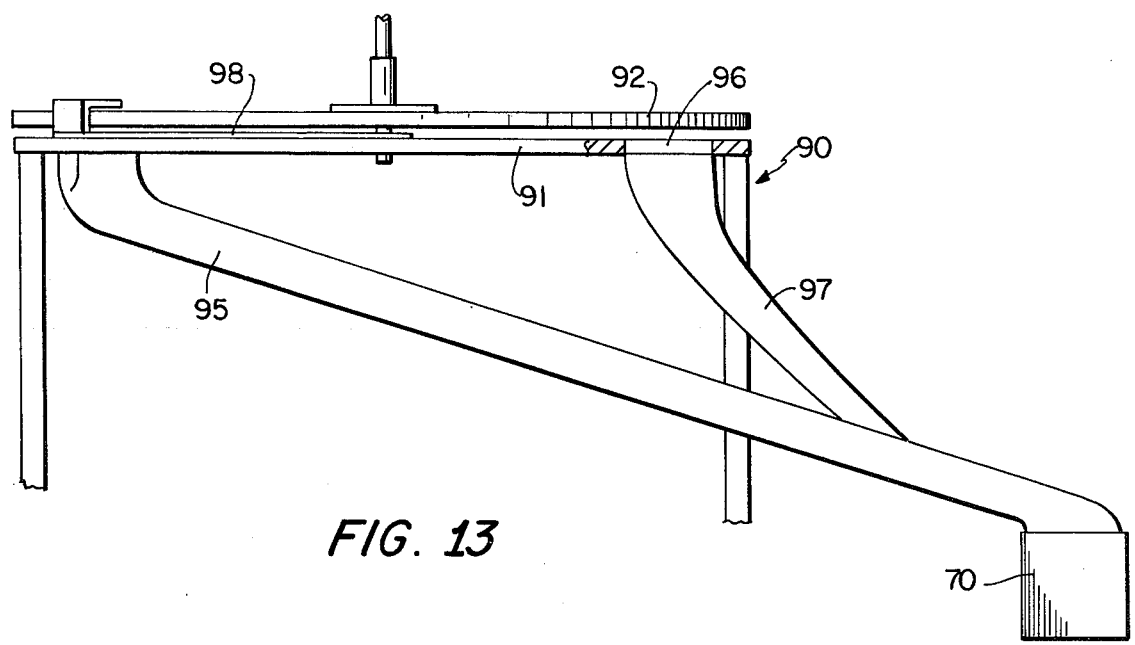
FIG. 13 is a side view thereof.

With particular reference to FIGS. 9, 10 and 11, the dunnage removal apparatus 73 includes a base member 74 mounted on the fixed frame of the orienting table 44 or the fixed structure in any desired manner, as by bolts or the like. A rocker arm 75 is pivotally mounted intermediate its ends to the base member 74 by a bolt 76 which functions as a pivot and the rocker arm is spaced from the base member 74 by a sleeve or spacer 77. A bolt 78 is attached to the rocker arm 75 adjacent the front end thereof and such bolt functions as an axle for a temple roll 79 of conventional construction. A spacer 80 is disposed between the rocker arm 75 and one end of the temple roll 79 to locate the temple roll in a position to engage the dunnage or protective sleeve 23 of the round of ammunition or other article 20.

The temple roll 79 includes a plurality of disks 81 each of which is provided with a multiplicity of radially disposed outwardly extending piercing points. As shown best in FIG. 11, each of the disks 81 is disposed at an angle less than 90° to the axis of the bolt 78 and is freely rotatably mounted thereon. The temple roll disks 81 are positioned so that the upstream edge is closer to the rocker arm 75 than the downstream edge for a purpose which will be described later.

The opposite end of the rocker arm 75 is connected by a spring or other resilient member 82 to a post 83 carried by the base member 74 to urge the temple roll 79 downwardly into engagement with the dunnage 23. In order to limit downward movement of the temple roll, a stop 84 is carried by the rocker arm and is positioned to engage the base member 74 when the temple roll is in the desired lowermost position. Preferably a plurality of rocker arms 75 are mounted in spaced relationship to each other on the base member 74 so that the dunnage or protective sleeve 23 will sequentially engage several temple rolls.

As the conveyor 72 moves the articles along, the dunnage (which normally is a cardboard or other relatively soft cylinder) engages the piercing points on the disks 81 of the first temple roll and causes such disks to rotate as the articles pass under the temple roll. The piercing points of the disks penetrate the dunnage and since the temple roll disks 81 are at an angle to the longitudinal axis of the temple roll, as well as at an angle to the direction of movement of the rounds of ammunition and the dunnage carried thereby, the penetrating points force the dunnage sleeve away from frictional gripping engagement with the article or round of ammunition 20 for a short distance until the dunnage sleeve disengages itself from the piercing points. Thereafter the dunnage sleeve engages the second and sequential temple rolls and is moved further away from the casing of the ammunition.

After the dunnage sleeve has been loosened and moved partially away from the casing of the round of ammunition, the inner end of the dunnage engages a cam 85 which is curved away from the casing of the ammunition so that continued movement of the conveyor 72 causes the cam 85 to completely remove the dunnage sleeve from the round of ammunition. Thereafter the conveyor 72 carries the rounds of ammunition to any desired location.

With particular reference to FIGS. 12-16, another embodiment of the orienting apparatus is provided and includes an orienting table 90 having a fixed lower plate 91 and a rotatable upper plate 92 which is driven in any desired manner, as by a drive shaft 49. The upper plate 92 is provided with a plurality of spaced radial slots 93 located adjacent to the periphery of the upper plate and each of such slots is of a size to receive a round of ammunition or other article 20 from the magazine 43. As in the previous embodiment, the butt end of the round of ammunition or other article extends above the upper surface of the upper plate 92, while the dunnage sleeve 23 is located below such upper surface. Adjacent to the magazine 43, the lower plate 91 is provided with a first discharge opening 94 which communicates with a chute 95 leading to a discharge magazine 70.

A second discharge opening 96 is provided in the lower plate 91 in a position substantially opposite the first discharge opening 94. The second discharge opening communicates with a chut 97 which leads to the first chute 95 just prior to the magazine 70 so that rounds of ammunition passing through the second chute are discharged into the first chute or if desired the second chute could discharge rounds of ammunition or other articles 20 directly into the discharge magazine 70.

In order to orient the articles, the first discharge opening 94 normally is covered by a trapdoor 98 which is rotatably mounted about the drive shaft 49. A spring or other resilient member 99 has one end connected to the trapdoor 98 and the opposite end is connected to a post 100 carried by the lower plate 91 in a position to urge the trapdoor 98 against a stop 101 located adjacent to the leading edge of the first discharge opening 94. The trapdoor 98 includes a sensor or contact finger 102 which extends upwardly and inwardly to a position overlying the upper plate 92.

Figure 14:
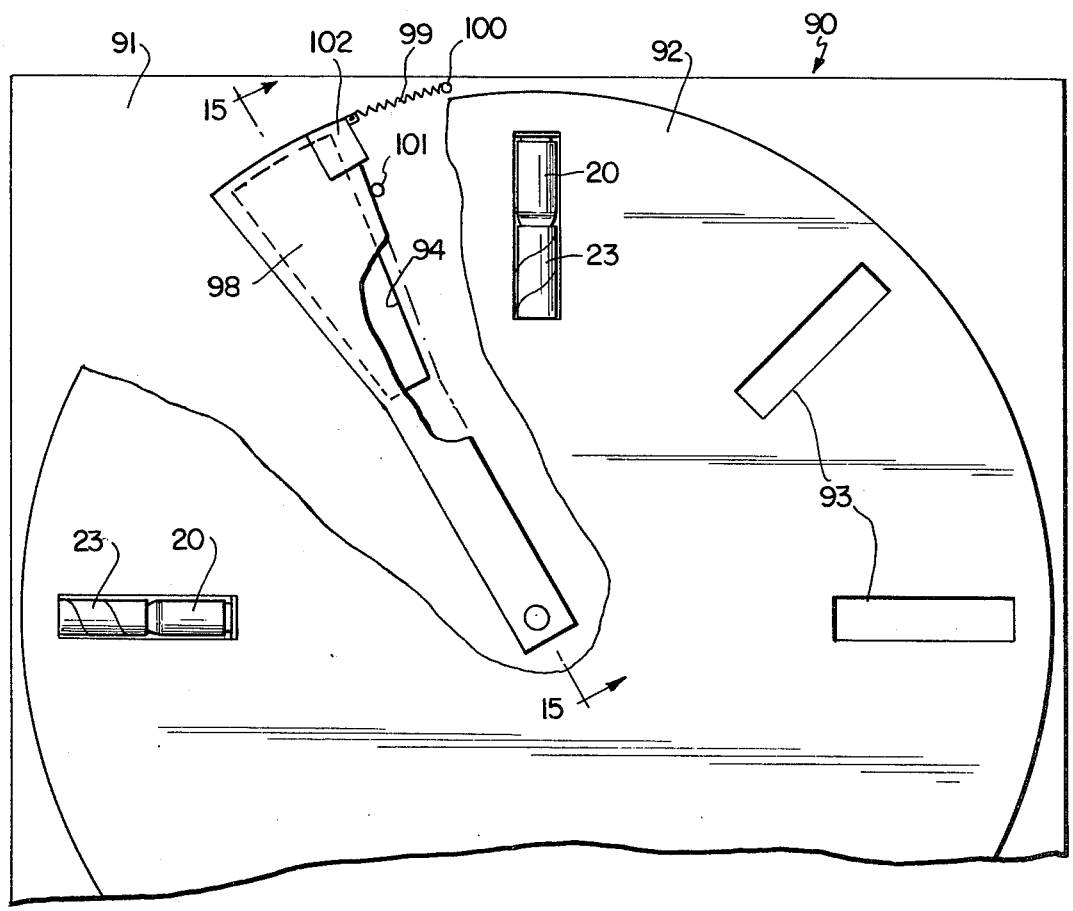
FIG. 14 is an enlarged fragmentary top plan view thereof with portions broken away for clarity.

When a round of ammunition is placed in one of the slots 93 with the butt end outermost, as illustrated in the upper portion of FIG. 14, rotation of the upper plate 92 causes the round of ammunition to roll along the fixed lower plate 91 until the butt end of the ammunition engages the sensor 102. Since the butt end cannot pass under the sensor, the round of ammunition forces the trapdoor 98 to swing as the round of ammunition is moved by the upper plate 92 to expose the first discharge opening 94 and permit the round of ammunition to fall by gravity therethrough. As soon as the article falls through the first discharge opening 94, the spring 99 returns the trapdoor 98 to a position against the stop 101 to close the first discharge opening.

If the article is located within the slot 93 with the butt end innermost, as illustrated on the left in FIG. 14, the smaller end of the article passes under the sensor 102 and rolls across the trapdoor 98. The article remains within the slot 93 until it reaches the second discharge opening 96 at the opposite side of the orienting table at which time the article falls by gravity through the second discharge opening into the chute 97 and slides into the magazine 70. It is noted that the rotation of the upper plate 92 is timed so that an article sliding down the second chute 97 does not fall on top of an article being discharged through the first chute 95 from the first discharge opening.

In the operation of the device, a box 21 containing a plurality of articles having an enlarged end, such as rounds of ammunition, are fed into the inverting mechanism 25 where the box is inverted so that the open top is lowermost after which the box is moved to a position overlying the hopper 35 to discharge the articles into the hopper. Articles are removed from the hopper one at a time by the drum 40 and are discharged into the magazine 43. Within the magazine the articles are supported by the upper surface of the upper plate 46 or 92 until such articles are discharged one at a time into the slots 66 or 93 whch extend through the upper plate. The sensor 67 or 102 senses the direction in which the article is facing and cooperates with the rotary plate to cause all of the articles to face in the same direction when the articles are discharged from the orienting table through a discharge chute 70, 94 or 96.

In the first embodiment the cooperation between the sensor and the rotating upper plate causes a disk in the upper plate to be partially rotated so that the gear teeth 56 engage the teeth 65 of the segmental gear 64 to rotate the article 180° when the article is facing one direction. If the article is facing in the opposite direction, no rotation occurs and therefore all of the articles are facing in the same direction at the time that they are discharged through the discharge slot 69.

In the second embodiment, articles which are facing in one direction are sensed by the sensor 102 immediately after leaving the magazine 43 and rotation of the upper plate causes the article to open the trapdoor 98 and discharge the article through the first discharge chute 95 to the magazine 70. When the article is facing in the opposite direction, the sensor does not open the trapdoor and the rotating table carries the article around to the opposite side of the orienting table where the article is discharged through the second discharge opening 96 and chute 97 so that the article falls by gravity into the magazine 70.

From the magazine 70 the articles are placed one at a time into the conveyor elements 71 so that the conveyor 72 carries the articles or rounds of ammunition to a dunnage removal apparatus 73 which automatically removes the dunnage therefrom as the conveyor 72 moves the ammunition along a relatively straight path of travel.

We claim:

1. An apparatus for orienting randomly facing articles having a larger end and a smaller end, comprising hopper means for receiving a plurality of such articles having substantially parallel longitudinal axes, means for removing said articles one at a time from said hopper means, an orienting table located adjacent to said hopper means and including a fixed plate means and a rotatable plate means, means for rotating said rotatable plate means, said rotatable plate means having a plurality of slots each of which is of a size to receive one of said articles, said fixed plate means having at least one discharge means, a portion of the larger end of said article extending above the upper surface of said rotatable plate means, sensor means located in a position to engage the larger end of said article when said article is facing in one direction but not engage the larger end when the article is facing in the opposite direction, said sensor means cooperating with said rotary plate means to discharge said articles from said orienting table through said discharge means when said articles are all facing in the same direction.

2. The structure of claim 1 in which said rotatable plate means includes a plurality of independently rotatable disk means, means for rotating said rotatable disk means substantially 180° when said sensor means engages the larger end of said article, whereby all of the articles are facing in the same direction before they are discharged from said orienting table.

3. The structure of claim 2 in which said means for rotating said rotatable disk means includes a first gear having non-continuous teeth mounted on said disk means, and a segmental gear carried by said fixed plate means in a position selectively to mesh with the teeth of said first gear means only when said sensor means engages an article carried by said disk means, whereby said sensor means causes initial rotation of said disk means so that the teeth of said first gear mesh with the teeth of said segmental gear to rotate said disk means substantially 180°.

4. The structure of claim 3 including detent means for retaining said rotatable disk means in fixed position until said sensor means engages said larger end of said article.

5. The structure of claim 1 in which said fixed plate means includes first and second discharge means located substantially at opposite sides thereof, trapdoor means slidably mounted on said first plate means, said trapdoor means normally covering said first discharge means, said sensor means being carried by said trapdoor means for moving said trapdoor means and uncovering said first discharge means when said sensor means engages the larger end of said article for discharging said article through said first discharge means, and means for returning said trapdoor means to said covering position after said article has been discharged.

6. The structure of claim 1 including means for introducing a plurality of articles into said hopper means.

7. An apparatus for orienting a plurality of rounds of ammunition having a larger end and a smaller end with a protective dunnage sleeve on the smaller end, comprising a hopper for receiving a plurality of rounds of ammunition having substantially parallel longitudinal axes, drum means for removing said rounds one at a time from said hopper and discharging said rounds into a first magazine, an orienting table located adjacent to said magazine, said orienting table including a fixed plate means and a rotatable plate means, means for driving said rotatable plate means, said rotatable plate means having a plurality of spaced generally radially disposed slots located adjacent to the outer periphery, each of said slots being of a size to receive one of said rounds of ammunition, the larger end of said round extending above the upper surface of said rotatable plate and the smaller end and the dunnage sleeve being located below the upper surface thereof, sensor means disposed above said rotatable plate means in a position to engage the larger end of said round of ammunition when the round is facing in one direction but not engaging said round of ammunition when the round is facing in the opposite direction, said fixed plate means having at least one discharge means, said sensor means cooperating with said rotary plate means to discharge said rounds of ammunition through said discharge means only when said rounds are facing in one direction, a second magazine for receiving said rounds of ammunition from said orienting table, conveyor means located adjacent to said second magazine for removing rounds of ammunition one at a time therefrom, and dunnage removal means located adjacent to said conveyor means for removing dunnage from said rounds of ammunition.

8. The structure of claim 7 in which said dunnage removal means includes a base member, a rocker arm movably carried by said base member, temple roll means rotatably mounted on said rocker arm, and means for maintaining said temple roll means in a position to engage the dunnage carried by said rounds of ammunition so that the dunnage is moved axially of said rounds and discharged therefrom.

9. The structure of claim 7 in which said means for introducing rounds of ammunition into said hopper includes an inverting mechanism of a size to receive a box of ammunition which is open at one side, said inverting mechanism being pivotally mounted on a support in a manner such that the inverting mechanism may be rotated substantially 180° so that the open side of said box is lowermost, said inverting mechanism being located adjacent to said hopper so that said ammunition box may be moved to a position overlying said hopper.

* * * * *